March 15, 1955  A. H. JACKSON  2,703,985

HYDRAULIC LEVEL INDICATING SYSTEM

Filed Aug. 31, 1953

INVENTOR.
ALBERT H. JACKSON

BY

ATTORNEYS

United States Patent Office 2,703,985
Patented Mar. 15, 1955

2,703,985

HYDRAULIC LEVEL INDICATING SYSTEM

Albert H. Jackson, Oxnard, Calif.

Application August 31, 1953, Serial No. 377,743

4 Claims. (Cl. 73—432)

(Granted under Title 35, U. S. Code (1952), sec. 266)

The invention described herein may be manufactured and used by or for the Government of the United States of America for governmental purposes without the payment of any royalties thereon or therefor.

The present invention relates to a hydraulic level indicating system and more particularly to a hydraulic level indicating system having certain portable members which are connected to other components of the system in such a manner that differences in altitude between a reference point and another point in an area may be determined, and the portable members may be adjusted to indicate when a certain point is level with or at the same altitude as the reference point.

In surveying and construction work, it often becomes necessary to set level or grade stakes in order to determine the slope of the land and for leveling the land or setting up forms into which concrete foundations and the like may be poured. In such cases, it is desirable to have an apparatus for quickly and easily determining when spaced grade stakes are level. Prior art devices such as the conventional transit are complicated and expensive in construction and require the cooperation of two persons working together in order to perform the leveling operation. Consequently, the use of prior art devices is expensive and time consuming.

The present invention comprises a hydraulic system including a liquid reservoir which is adapted to be fixedly mounted in a desired position thereby serving as a reference point, and a portable indicating means is connected to the reservoir by means of an elongated flexible conduit. A liquid is disposed within the reservoir and the conduit such that the pressure head of the liquid acts upon the indicating means whereby the relative altitudes of the reservoir and the indicating means may be determined at all times. Accordingly, the portable components of the device may be moved from point to point over an area and the leveling operation may be quickly and easily performed by one person.

An object of the present invention is the provision of a new and novel hydraulic level indicating system which enables the determination of the relative altitudes of widely separated points.

Another object is to provide a hydraulic level indicating system which may be effectively operated by one person.

A further object of the invention is the provison of a hydraulic level indicating system which is simple and inexpensive in construction, yet sensitive and reliable in operation.

Other objects and many of the attendant advantages of this invention will be readily appreciated as the same becomes better understood by reference to the following detailed description when considered in connection with the accompanying drawings wherein.

Figure 1:
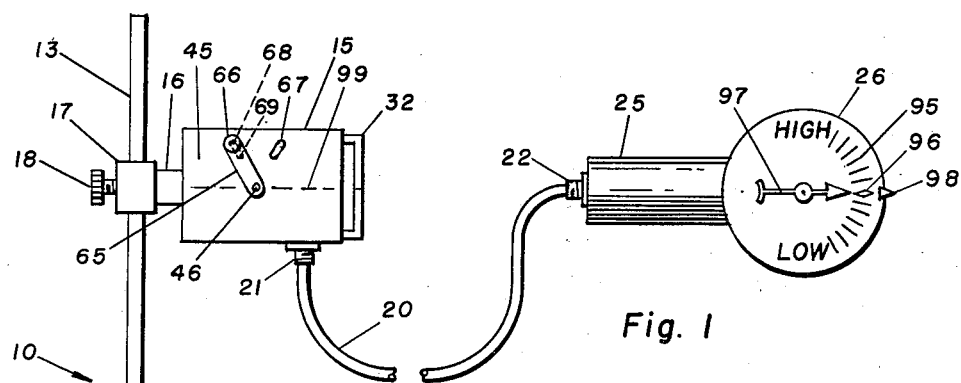
Fig. 1 is a somewhat schematic view of a preferred embodiment of the invention.

Referring now to the drawings, wherein like reference characters designate like or corresponding parts throughout the several views, there is shown in Fig. 1 a conventional support stand indicated generally by reference numeral 10 which comprises a substantial disc-shaped base plate 11 having three equally spaced legs 12 extending downwardly therefrom, and an upwardly extending rod 13 is suitably secured as by welding or the like to the base plate.

A liquid reservoir 15 composed of aluminum, copper or similar material has an arm 16 formed integral therewith and a clamp 17 is secured to the end of the arm as by welding or the like. Clamp 17 has a passage extending longitudinally therethrough, and the clamp is slidably mounted on rod 13 such that the rod is disposed within the passage. A set screw 18 is threaded into an opening in the lateral portion of the clamp and is adapted to engage rod 13 whereby the clamp and reservoir may be secured in a fixed position relative to the support stand.

A relatively thin-walled conduit or tube 20 is formed of a suitable light flexible material such as synthetic resins, rubber or the like which is adapted to withstand the wear and tear to which the tube may be subjected in use and which is capable of withstanding the operating pressures of the liquid within the tube. One end of the tube is provided with a fitting 21 which is connected to the reservoir and the opposite end of the tube is provided with a fitting 22 which is connected to a handle 25 of a sensitive differential pressure gauge 26 of conventional construction.

Figure 2:
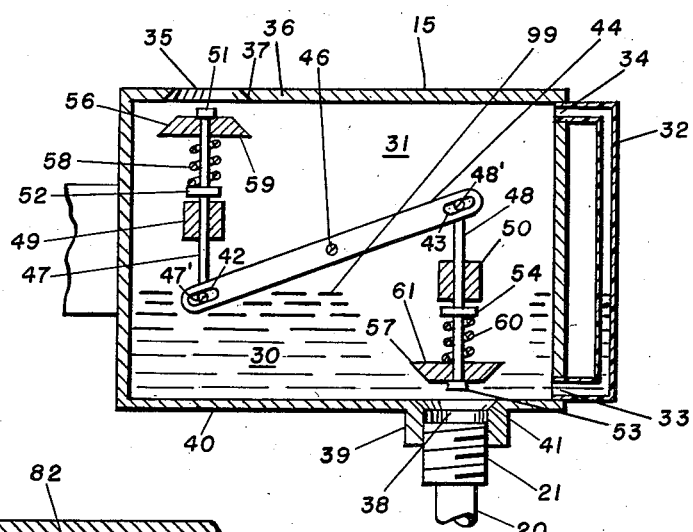
Fig. 2 is an enlarged sectional view of the liquid reservoir shown in Fig. 1.

Referring now to Fig. 2, a body of liquid 30 is disposed in a cavity 31 formed within reservoir 15, the liquid having suitable properties such that it will remain liquid at a substantially constant viscosity and density in the range of temperatures encountered in operation of the device, and it should have a vapor pressure as low as possible. Suitable liquids adapted for use with the device are ethylene glycol, propyl alcohol and the like; water is also suitable for the purpose, provided it is carefully deaerated before use.

A transparent tube 32 formed of a suitable material such as synthetic resins, glass or the like is mounted on the reservoir such that one end 33 thereof opens into cavity 31 adjacent the bottom of the reservoir and the opposite end 34 opens into the cavity adjacent the top of the reservoir whereby the level of the liquid within the reservoir may be observed at all times.

A filler opening 35 is provided in the top wall 36 of the reservoir through which liquid may be admitted into or removed from the reservoir, and a valve seat 37 is formed within wall 36 adjacent opening 35. A threaded outlet opening 38 is provided within a flange 39 formed integral with the lower wall 40 of the reservoir, and a valve seat 41 is formed within wall 40 adjacent opening 38.

An arm 44 is fixed at the midpoint thereof to a shaft 46 which is rotatably journalled within a lateral wall 45 of the reservoir and extends to the exterior of the reservoir. A first valve stem 47 has a lug 47' formed integral therewith which is slidably disposed within a slot 42 formed in one end of arm 44, and a second valve stem 48 has a lug 48' formed integral therewith which is slidably disposed within a slot 43 formed in the opposite end of the arm. Valve stems 47 and 48 are respectively slidably mounted within guide members 49 and 50 which are suitably secured as by welding or the like to wall 45. Valve stem 47 has an enlarged end portion 51 and a shoulder 52 formed integral therewith, and valve stem 48 has an enlarged end portion 53 and a shoulder 54 formed integral therewith. Valve heads 56 and 57 have longitudinally extending passages formed therein of substantially the same cross-sectional area as the valve stems, and heads 56 and 57 are respectively slidably mounted on stems 47 and 48, a spring 58 being interposed between shoulder 52 and surface 59 of head 56, and a spring 60 being interposed between shoulder 54 and surface 61 of head 57. Enlarged end portions 51 and 53 prevent excessive longitudinal movement of heads 56 and 57 under the influence of the springs. It is evident, therefore, that when arm 44 is pivoted in a clockwise direction, as seen in Fig. 2, valve heads 56 and 57 will be urged into engagement with valve seats 37 and 41 respectively, and springs 58 and 60 assure positive engagement of the valve heads with the seats.

As seen in Fig. 1, shaft 46 extends exteriorly of the reservoir and has a leaf spring handle 65 secured thereto, the end portion 66 of the handle being urged toward the lateral wall 45 of the reservoir due to the inherent resiliency of the handle. Two notches 67 and 68 are formed in the exterior of wall 45, and end portion 66 of the handle is provided with a lug 69 which is formed parallel with the sides of handle 65 and is adapted to seat within the notches. In this manner, a locking means is provided whereby the handle may be locked in either open or closed position. As shown in Fig. 1, the handle is in open position and the valve heads are in the position as shown in Fig. 2. By lifting handle 65 such that the lug thereon is removed from notch 68, the handle may be rotated to the point where the lug seats within notch 67 and the valve heads will be moved into engagement with the respective valve seats. The valve heads should be urged to closed position whenever the device is transported or moved from place to place to assure that no air bubbles are admitted into the flexible tube and that no liquid is spilled from the reservoir.

Figure 3:
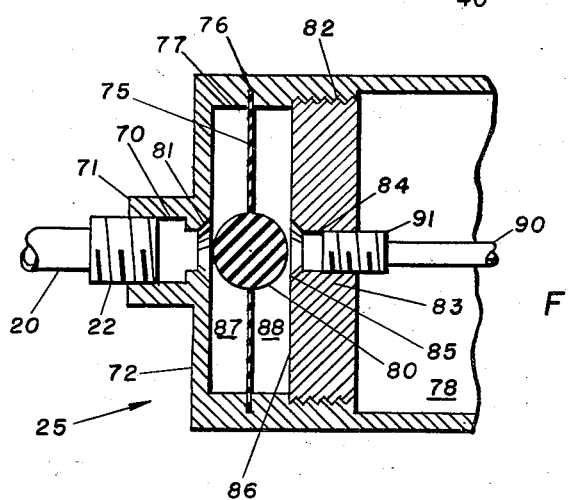
Fig. 3 is an enlarged sectional view of a portion of the gauge shown in Fig. 1.

As seen in Fig. 2, fitting 21 on one end of tube 20 is provided with screw threads and is threaded into opening 38; and as seen in Fig. 3, fitting 22 on the opposite end of the tube is provided with screw threads and is threaded into a threaded opening 70 within a flange 71 formed integral with the end wall 72 of handle 25. It should be noted that other types of conventional fittings may be utilized for connecting the tube to the reservoir and the gauge, or the tube may be permanently fixed to these members, if desired.

A safety pressure limiting means is provided in handle 25 for preventing excessive pressures from being exerted on the pressure gauge which might damage some of the delicate components of the gauge. The safety means includes a substantially disc-shaped flexible diaphragm 75 formed of rubber, synthetic resins or the like, the outer periphery of the diaphragm being mounted within a circumferential groove 76 formed in the inner periphery 77 of a cylindrical cavity 78 formed within handle 25.

Diaphragm 75 is provided with an enlarged central portion 80 which is substantially spherical in configuration, and a seat 81 of complementary configuration is provided in wall 72. Screw threads 82 are provided on the inner periphery 77 and a disc-shaped member 83 provided with screw threads on the outer periphery thereof is threaded in position adjacent the diaphragm as shown. A centrally located threaded opening 84 is provided in member 83, and a seat 85 formed in surface 86 of member 83 has a configuration complementary to that of member 80.

It should be noted that a first chamber 87 is provided between one side of diaphragm 75 and the inner surface of wall 72 and a second chamber 88 is provided between the opposite side of the diaphragm and surface 86 of member 83. A tube 90 is provided with a fitting 91 which is threaded into opening 84, the tube providing communication between chamber 88 and the pressure sensitive diaphragm (not shown) of gauge 26.

A liquid identical with that in cavity 31 is disposed within tube 20 and chamber 87, and a similar liquid is disposed within chamber 88 and tube 90 whereby the liquid disposed in the various components of the device is adapted to transmit the atmospheric pressure acting on the reservoir and the gauge.

As seen in Fig. 1, gauge 26 is provided with a scale 95 having a "level" mark 96 to which needle 97 points when a small indicator 98 provided on the gauge housing is level with the upper surface 99 of the liquid within reservoir 15. One end of the scale marked "high" indicates that indicator 98 is above the level of surface 99, and the other end of the scale marked "low" indicates that indicator 98 is below the level of surface 99. It is evident that it is merely necessary to manually adjust the altitude of the gauge to a position where needle 97 points to mark 96 to dispose indicator 98 at the same altitude as surface 99. By properly calibrating scale 95, it is also possible to get a direct reading of the difference in altitude between indicator 98 and surface 99 in cases where it may be desired to determine the slope of the land and the like. The gauge is preferably made sufficiently sensitive such that a pressure head of plus or minus 5 inches of the liquid disposed within cavity 31, tube 20 and chamber 87 will cause needle 97 to deflect through the entire range of scale 95.

Referring again to Figure 3, it may be seen that if the gauge is elevated above surface 99, the pressure differential acting on diaphragm 75 will cause the diaphragm to be deflected to the left and after a predetermined amount of displacement, portion 80 will engage seat 81 preventing any further flow of liquid from chamber 87 into tube 20 and thereby limiting the negative pressure head acting on the pressure sensitive diaphragm of the pressure gauge. In a similar manner, if the gauge is lowered below surface 99, the pressure differential acting on diaphragm 75 will cause the diaphragm to be deflected to the right and after a predetermined amount of displacement, portion 80 will engage seat 85 and prevent any further flow of liquid from chamber 88 into tube 90 thereby limiting the positive pressure head acting on the pressure sensitive diaphragm of the pressure gauge. The volumetric displacement of the liquid within chambers 87 and 88 as limited by engagement of portion 80 with seats 81 and 85 respectively is adjusted such that full scale readings are obtainable on the gauge and yet excessive pressures are prevented from acting on the gauge.

In operation, the support stand 10 may be set up at any desired reference point and the level of the upper surface of the liquid in the reservoir may be adjusted by moving clamp 17 up and down rod 13 or by adjusting the amount of liquid within the reservoir by admitting into or removing liquid from cavity 31 through opening 35. When the liquid is at the desired level as viewed through tube 32, the clamp may be locked in place by means of set screw 18. Since tube 20 may be of any desired length and is quite flexible, gauge 26 may be transported to various points and the leveling operation may be quickly and efficiently performed.

From the foregoing, it is apparent that there is provided a new and novel hydraulic level indicating system which enables the determination of the relative altitudes of widely separated points and which may be effectively operated by one person. The system is simple and inexpensive in construction, yet is sensitive and reliable in operation.

Obviously many modifications and variations of the present invention are possible in the light of the above teachings. It is therefore to be understood that within the scope of the appended claims the invention may be practiced otherwise than as specifically described.

I claim:

1. A hydraulic level indicating system which comprises a liquid reservoir having a cavity therein, means for supporting said reservoir in a desired position, a plurality of openings formed in said reservoir, means for selectively sealing said openings, an elongated flexible tube having one end connected to said reservoir and in communication with one of said openings, the other of said openings being in communication with atmosphere, a differential pressure gauge connected to the other end of said tube, and means supported by said gauge for limiting the pressure acting on said gauge.

2. A device as defined in claim 1 wherein said means for sealing said openings comprises an arm pivotally mounted within said cavity, a valve stem pivotally connected to each end of said arm, each of said stems being slidably mounted within a guide member secured to said reservoir, a valve head slidably mounted on each of said stems, a shoulder on each of said stems, and a resilient member disposed between the shoulder and valve head on each stem.

3. A device as defined in claim 2 including a means for selectively actuating said arm, and means disposed exteriorly of and supported by said reservoir for indicating the level of the liquid within the reservoir.

4. A hydraulic level indicating system which comprises a liquid reservoir having a cavity therein, means for supporting said reservoir in a desired position, there being two openings formed in said reservoir, means for sealing said openings comprising an arm pivotally mounted within said cavity, a valve stem pivotally connected to each end of said arm, each of said stems being slidably mounted within a guide member secured to said reservoir, a valve head slidably mounted on each of said stems, a shoulder on each of said stems, and a resilient member disposed between the shoulder and valve head on each stem, means for selectively actuating said arm, means disposed exteriorly of and supported by said reservoir for indicating the level of the liquid within the reservoir, an elongated flexible tube having one end connected to said reservoir and in communication with one of said openings, the other of said openings being in communication with atmosphere, a differential pressure gauge connected to the other end of said tube and having a hollow handle portion, a body of liquid disposed within said cavity and said tube, safety means mounted within said handle portion and including a flexible diaphragm, said handle portion having a plurality of chambers formed therein each of which is disposed on opposite sides of said diaphragm, a body of liquid disposed within one of said chambers and being in communication with the liquid within said tube, a body of liquid disposed within the other of said chambers for actuating said gauge, said diaphragm having an enlarged central portion, a valve seat formed in said handle portion on either side of said diaphragm and controlling liquid flow into and out of said chambers, said central portion being adapted to engage one of said seats upon displacement of the liquid within said chambers.

References Cited in the file of this patent
UNITED STATES PATENTS

| | | |
|---|---|---|
| 2,216,374 | Martin | Oct. 1, 1940 |
| 2,557,021 | Williams | June 12, 1951 |
| 2,667,184 | Hailer et al. | Jan. 26, 1954 |